Oct. 18, 1932.  R. SAELZLER  1,882,953
MIXTURE VALVE
Filed May 25, 1931
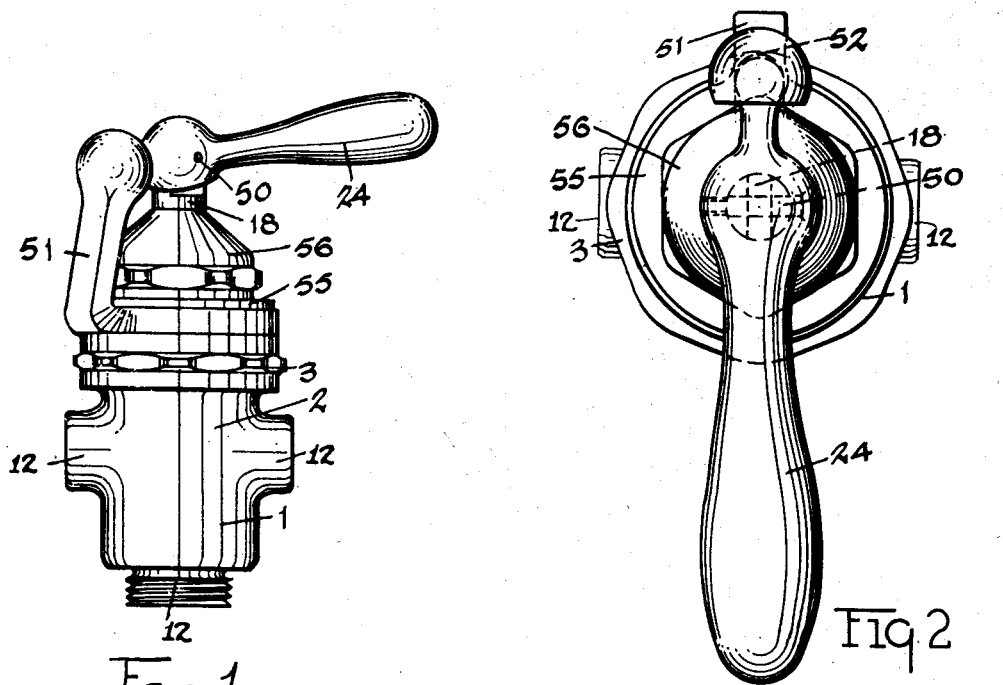
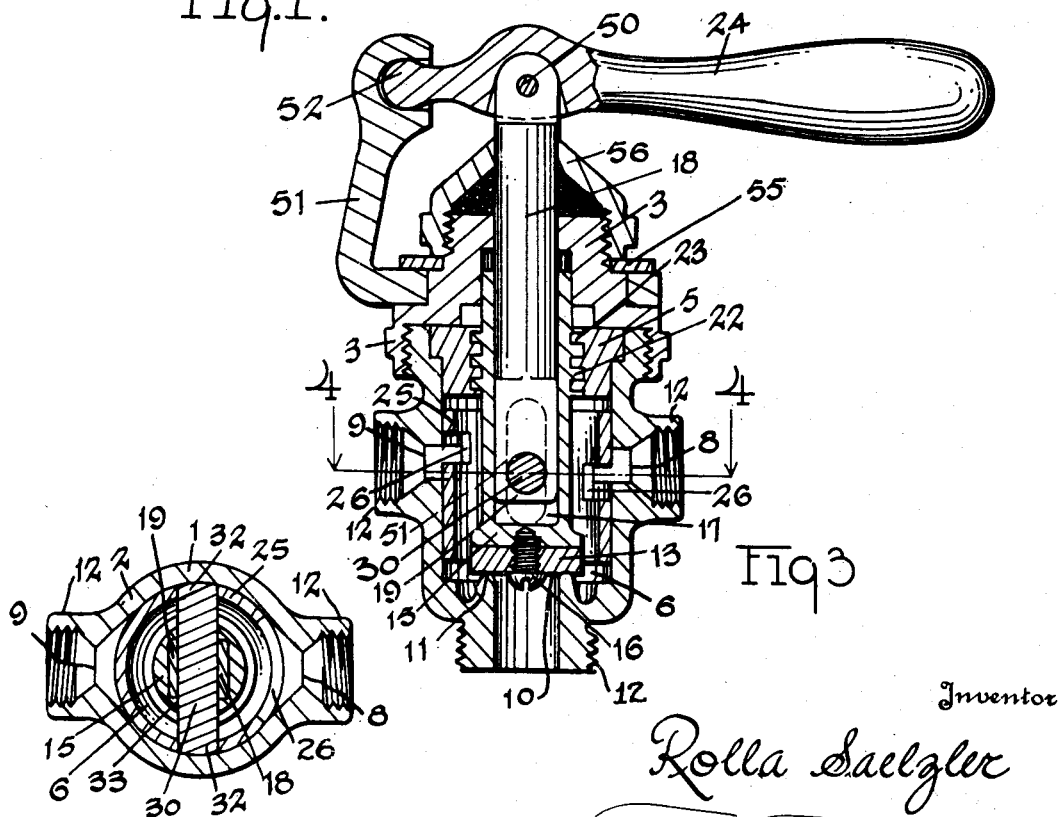
Inventor
Rolla Saelzler
By Faust F. Crampton
Attorney Patented Oct. 18, 1932

1,882,953

UNITED STATES PATENT OFFICE

ROLLA SAELZLER, OF TOLEDO, OHIO

MIXTURE VALVE

Application filed May 25, 1931. Serial No. 539,697.

My invention relates to valves for controlling the movements of fluids through fluid conveying bodies such as pipes. The invention particularly relates to mixing valves which may be provided with a plurality of inlets through which a variety of fluids having varying characteristics such as to temperature, or as to chemical content, may enter and pass through the valve to a common outlet. The invention has for its object to provide a single control mixing valve having a central mixing chamber which is connected by ports through the walls of the chamber to a plurality of fluid conveying pipes. The invention also provides a means for varying the active areas of the ports so as to obtain various ratios of mixture of fluids within the mixing chamber preparatory to their delivery at the outlet. The invention also has for its object to provide a means for opening the outlet of the valve to allow discharge of the fluids from the mixing chamber and for varying the effective areas of the inlet ports to vary the mixture of fluid delivered at the outlet without varying the volume of the fluid passing through the outlet.

The invention consists in other features and advantages which will appear from the following description, and upon examination of the drawing. Structures containing the invention may partake of different forms and may be varied in their details and still embody the invention. To illustrate a practical application of the invention, I have selected a mixing valve embodying the invention as an example of such structures, and the details of such structures that contain the invention, and shall describe the selected structure hereinafter, it being understood that variations may be made and that certain features of my invention may be used to advantage without a corresponding use of other features, and without departing from the spirit of the invention. The particular structure selected is shown in the accompanying drawing.

Fig. 1 is a view of a side elevation of the mixture valve. Fig. 2 is a top view of the mixture valve. Fig. 3 is a cross sectional view of the valve. Fig. 4 is a view of a section taken on the plane of the line 4—4 as indicated in Fig. 3.

Heretofore, it has been customary to provide fluid mixing valves with suitable chambers having ports which may be opened or closed by the operation of valve members for controlling the inflow of fluid into the chambers. The inflow of fluids is controlled by varying the effective areas of the ports to introduce, into the chamber of the mixing valve, such fluids as are desired to be combined. However, the valve members provided to open or vary the size of the effective areas of the inlet ports, also open or vary the effective areas of the outlet ports, so that the volume of flow through the outlet port varies as the ratio of mixture of fluids varies. Consequently, it has been difficult to maintain substantially the same combination, or ratio of mixture of fluids while maintaining control over the volume of flow of the fluid through the outlet port of the mixing valve. This results in a decided waste and overflow of the fluids at the outlet by reason of the uncontrolled flow of fluid from the outlet port of the mixing valve taking place while the valve is adjusted to establish the desired ratio of mixture. In the use of my invention, the ratio of the mixture may be readily established before the outlet ports of the mixing valve are opened. As the inlet and outlet ports are opened by a suitable handle, the volume and ratio of mixture of fluid in the chamber of the mixing valve will be controlled by the size of the effective open areas of the ports.

In the preferred form of my invention, the handle for operating the mixing valve is supported so as to permit rotative movements of the handle in planes extending at right angles to each other. The handle may be manipulated selectively in one plane, or in the two planes to move interconnected valve parts according to the desired volume of flow or ratio of mixture, of the fluid. Preferably, the handle of the mixing valve is connected to a sleeve member, having suitably disposed openings, which may be reciprocally moved by the handle and thereby locate the openings in proximity to the inlet ports to vary the effective open areas of the ports. By movement of the sleeve, the desired ratio of mixture of the fluids in the chamber of the mixing valve may be maintained while the volume of flow through the ports is adjusted. The handle may be connected to the sleeve member so that it may be reciprocally moved to vary the effective areas of the inlet ports preparatory to opening the outlet port of the mixing valve. The handle may then be rotated to open the inlet and outlet ports. The effective open areas of the inlet ports may be further varied by reciprocation of the sleeve to establish other ratios of mixture of the fluids while the outlet port is open.

In the preferred form of construction illustrated in the drawing, the operating parts of the mixing valve are located in a suitable casing 1. The casing 1 may be formed to have a body portion 2 and a cap or closure member 3. A plug 5 may be located in the upper part of the body portion 2 and secured therein by the cap 3, forming a closed chamber 6 within the body portion 2 of the casing 1. The body portion 2 of the casing may also be provided with a plurality of ports, such as the ports 8, 9 and 10, having threaded nipples 12 for connecting the mixing valve with suitable pipes for conveying fluids to and from the mixing valve. The edges of the port 10 form a valve seat 11 which may be closed by the usual fiber washer 13 which is connected to a plunger 15 of the valve by a suitable screw 16. The plunger 15 is moved by a suitable valve stem 18 to force the washer 13 against the valve seat 11 thereby closing the outlet port 10.

The valve stem 18 has a squared end portion 19 which is slidably fitted in a rectangular socket 17 which extends into the plunger 15. The plunger 15 may be provided with a threaded portion 22 which is adapted to coact with threads 23 formed in the plug 5 to move the plunger and the washer 13 relative to the valve seat 11 of the outlet port 10 to close, or open the outlet port 10, as the plunger 15 is rotated, by rotation of the valve stem 18. The valve stem 18 is also connected to a sleeve 25, having suitable openings 26 which may be rotated, to positions of registration with the ports 8 and 9. The volume of flow through the chamber may thus be controlled by operation of the valve stem 18 to rotate the plunger 15 and the sleeve 25 to open or close the ports 8, 9 and 10 of the mixing valve.

In order to vary the effective areas of the inlet ports 8 and 9 to control the volume of inflow into the chamber 6, according to a desired ratio of mixture of the fluids, or to permit the inflow through a single port, the sleeve 25 has substantially the same outer diameter as the diameter of the chamber 6. Assuming the ports 8 and 9 to be diametrically opposed to each other, the openings 26 are preferably formed in the sleeve so that the lower edge of one opening 26 is located in the plane of the upper edge of the opposite opening, the plane extending at right angles to the axis of the sleeve 25. The sleeve 25 may be connected by a suitable means to the valve stem 18 such as by the pin 30. The central portion of the pin 30 may be located in the lower end 19 of the valve stem 18 so as to locate the ends 32 of the pin in slots 33 formed in the walls of the plunger 15. The slots 33 preferably extend lengthwise in the walls of the plunger so as to permit reciprocal movement of the pin 30 through the slots as the stem 18 is reciprocally moved to locate the openings 26 of the sleeve 25 relative the ports 8 and 9. Upon reciprocal movement of the stem 18 and sleeve 25 in the chamber 6, one of the openings 26 of the sleeve 25 will be moved to a position in alignment with either of the ports 8 or 9, while other of the ports will be completely closed off by the wall of the sleeve 25, thereby permitting the flow of a fluid through either the port 8 or 9, when the valve stem 18 is rotated to open the port 10. The sleeve 25 may also be moved, as the stem is rotated to open the outlet port 10, to locate the openings 26 proximate to the ports 8 and 9 so as to control the flow of fluids through the inlet ports 8 and 9, according to the desired combination of the fluids in the chamber 6. The valve stem 18 may be connected to a suitable handle 24 by a pin 50 for manual adjustment of the plunger 15 and the sleeve 25 to control the ports 8, 9 and 10 of the mixing valve.

In order to permit reciprocal or rotative movements of the valve stem 18 for opening the ports of the mixing valve and for controlling the effective open areas of the ports, the ends of the handle 24 are preferably supported in a suitable bracket 51 by a ball and socket joint 52, in a manner well known in the art. The bracket 51 may be supported on the casing 1 by a washer 55 and a threaded cap 56 to permit rotative movements of the handle 24 and the bracket 51 relative to the casing 1 as the handle is operated to open or close the ports of the mixing valve. By reason of the rotatably supported bracket 51, the handle 24 may also be rotated about the pivot of the ball and socket joint 52 to vary the effective areas of the ports 8 and 9 by reciprocally moving the sleeve 25 relative to the inner ends 12 of the ports while the ports 8, 9 and 10 are open.

Thus, when it is desirable to adjust the volume of the inflow of the fluids through the ports 8 and 9, and preparatory to opening the port 10, the handle 24 may be rotated about the axis of the pin 50 and on the ball and socket joint 52 to cause endwise movement of the sleeve 25 relative to the ports 8 and 9. Upon rotation of the handle 24 and bracket 51 about the axis of the stem 18, the sleeve 25 will be moved to open the inlet ports 8 and 9 according to the effective areas established by the registration of the openings 26 of the sleeve 25 relative to the ports 8 and 9, and the washer 13 will be moved to open the outlet port 10. The desired ratios of mixture of the fluids and the desired volume of flow may be obtained during the use of the mixing valve by combined rotation of the handle 24 about the axes of the valve stem 18 and the pin 50, either rotatively or reciprocally, the effective open areas of the ports 8 and 9 being varied by movement of the sleeve 25 during the flow of fluid through the mixing valve. However when the sleeve is moved reciprocally, the effective area of the port 10 will always remain constant. When the sleeve 25 is rotated, the effective area of the port 10 will increase or diminish proportionately the same as the combined effective areas of the openings through the ports 8 and 9.

I claim:

1. In a mixing valve having a casing, the casing having a chamber, a plurality of ports formed in the walls of the chamber, a member rotatably supported on the casing, a handle pivotally supported in the member, a valve stem connected to the handle, a sleeve slidably supported in the chamber and having slotted openings, the openings being adapted to register with some of the ports, means for closing other of the ports, and a pin for interconnecting the handle to the sleeve for allowing reciprocatory movement of the sleeve to vary the areas of the openings of the sleeve relative to the ports.

2. In a mixing valve having a casing, the casing having a chamber, a plurality of ports formed in the walls of the chamber, a handle, a valve stem connected to the handle, a sleeve having openings adapted to register with some of the ports of the chamber, a plunger for closing other of the ports of the chamber, and the sleeve and the plunger being interconnected with the valve stem for causing rotary movement of the sleeve and plunger upon rotary movement of the handle to open the ports of the chamber.

3. In a valve, a casing having a chamber, the chamber having an outlet, a plurality of inlet ports formed in the casing walls communicating with the chamber, a handle, a valve stem, the valve stem connected to the handle, a valve member for closing the outlet and having a socket, the valve stem being slidably movable in the socket, a sleeve member reciprocally movable in the chamber, the sleeve member having a plurality of ports located diametrically opposite and in staggered longitudinal relation to each other, the sleeve member being connected to the valve stem for reciprocating the sleeve member without moving the valve member to register the ports in the sleeve member with the inlet ports of the chamber.

In witness whereof I have hereunto signed my name to this specification.

ROLLA SAELZLER.